United States Patent [19]
Yokouchi et al.

[11] Patent Number: 5,840,666
[45] Date of Patent: Nov. 24, 1998

[54] GREASE COMPOSITION

[75] Inventors: Atsushi Yokouchi; Hideki Koizumi; Kenichi Iso; Michiharu Naka, all of Kanagawa, Japan

[73] Assignee: NSK Ltd., Tokyo, Japan

[21] Appl. No.: 770,852

[22] Filed: Dec. 20, 1996

[30] Foreign Application Priority Data

Dec. 20, 1995 [JP] Japan ................................. 7-348520
Feb. 9, 1996 [JP] Japan ................................. 8-046917

[51] Int. Cl.$^6$ ................................. C10M 103/00
[52] U.S. Cl. ..................... 508/107; 508/108; 508/109; 508/113; 508/154; 508/155; 508/161; 508/165; 508/167; 508/172; 508/178; 508/179; 384/13
[58] Field of Search ..................... 508/100, 107, 508/108, 109, 113, 154, 155, 161, 165, 167, 172, 176, 178, 179; 384/13

[56] References Cited

U.S. PATENT DOCUMENTS

| | | | |
|---|---|---|---|
| 2,719,826 | 10/1955 | Hotten | 508/178 |
| 3,852,203 | 12/1974 | Morisaki | 508/100 |
| 3,935,114 | 1/1976 | Donaho, Jr. | 508/165 |
| 4,507,214 | 3/1985 | Aldorf | 508/165 |
| 4,986,923 | 1/1991 | Waynick | 508/154 |
| 5,015,401 | 5/1991 | Landry et al. | 508/154 |
| 5,037,563 | 8/1991 | Pink et al. | 508/178 |
| 5,156,756 | 10/1992 | Kojima et al. | 508/178 |
| 5,200,098 | 4/1993 | Dumdum et al. | 508/154 |
| 5,282,986 | 2/1994 | Otake et al. | 508/161 |
| 5,385,682 | 1/1995 | Hutchings et al. | 508/178 |

*Primary Examiner*—Sharon Gibson
*Assistant Examiner*—Cephia D. Toomer
*Attorney, Agent, or Firm*—Sughrue, Mion, Zinn, Macpeak & Seas, PLLC

[57] ABSTRACT

A grease composition comprising a base oil, a thickener selected from a metallic soap and a urea compound, and an inorganic filler having an average particle size of not greater than 2 $\mu$m, and a rolling bearing having sealed therein a grease composition comprising a base oil, a urea thickener, and an inorganic filler having an average particle size of not greater than 2 $\mu$m.

9 Claims, 1 Drawing Sheet

5,840,666

GREASE COMPOSITION

FIELD OF THE INVENTION

This invention relates to a grease composition and more particularly a grease composition effective against flaking of rolling bearings and suitable for application to rolling bearings used in electric parts and auxiliary engine equipment of automobiles, such as an alternator, an electromagnetic clutch for an air conditioner, an intermediate pulley, an electric fan motor, and a water pump. This invention also relates to a sealed rolling bearing containing grease and more particularly to a sealed rolling bearing suitable for use in a high temperature and at a high rotational speed, for example in the above-described electric parts and auxiliary engine equipment of automobiles.

BACKGROUND OF THE INVENTION

Rolling bearings are used in rotating parts of automobiles and various drives, for example, electric parts and auxiliary engine equipment of automobiles, such as an alternator, an electromagnetic clutch for an air conditioner, an intermediate pulley, an electric fan motor, a water pump, etc.

Figure shows a partial cross section of a deep groove ball bearing sealed with a contact rubber seal, which is one type of rolling bearings. The ball bearing shown in Figure is composed of a concentrically disposed set of inner race 2 and outer race 4, inner race 2 providing inner raceway 1 on its outer circumference, and outer race 4 forming outer raceway 3 on its inner circumference, and a plurality of rolling elements (balls) 5 rotatably held between inner raceway 1 and outer raceway 3 by cage 7. Each of annular seals 6 is fitted, at one end thereof, to each end of outer race 4 on its inner circumference so that the grease applied around balls 5 or dust generated may not leak outside or dust suspending outside may not enter the inside of the ball bearing.

With the spread of front-engine front-drive automobiles aiming at size and weight reduction and the increase of demand for wide car space, the space for the engine has been unavoidably reduced, and the size and weight reduction of the above-described electric parts and auxiliary engine equipment has been advancing. Besides, the electric parts themselves have been required to have improved performance and higher output. Size reduction unavoidably leads to reduction of output, so that a reduction in output of an alternator or an electromagnetic clutch for an air conditioner, for instance, has been compensated for by speeding up. It follows that the speed of an intermediate pulley has been increasing.

Further, since a tendency to enclosure of an engine has been increasing because of the demand for low noise, the temperature within an engine housing has been increased. Therefore, the aforesaid parts must withstand high temperatures.

Furthermore, the load imposed to bearings has been increasing with an increase in tension of a driving belt.

In order to cope with these tendencies, grease for the roll bearings used in the automobile parts is required to have high durability, high performance against flaking, excellent torque performance, anticorrosion performance, and noiseless properties (acoustic properties). Grease compositions comprising a heat-resistant synthetic oil as a base oil and a urea compound as a thickener are now in wide use as grease satisfying these requirements.

Grease for use in rolling bearings for automobiles has been required to have a long lubrication life, to hardly leak, and to have excellent low-temperature performance, anti-corrosion performance, and acoustic properties.

JP-A-3-79698, JP-A-5-140576, and JP-A-6-17079 (the term "JP-A" as used herein means an "unexamined published Japanese patent application") disclose diurea compounds predominantly terminated with a cyclohexyl group as a thickener providing lubrication of long duration.

With the above-described speeding up and advancement of performance, a high load is applied periodically to the raceways of a rolling bearing (reference numerals 1 and 3 in Figure), which produces a new problem of flaking. As regards a flaking phenomenon, any of grease compositions containing the above-mentioned diurea compounds predominantly terminated with a cyclohexyl group as a thickener induces flaking in the early stage and therefore has not been put to practical use.

Long-life grease for high-speed rolling bearings aiming at prevention of flaking has also been developed. For example, JP-A-5-98280, JP-A-5-194979, and JP-A-5-263091 disclose grease compositions containing diurea compounds mainly terminated with an aromatic hydrocarbon group as a thickener. However, a further improvement in prevention of flaking is still awaited.

Improvement of prevention of flaking has thus been added to the conventional grease compositions by selection of a thickener. However, flaking prevention by mere selection of a thickener has its own limit and cannot be expected to bring about further improvement.

Further, as the demand for highly durable rolling bearings of electric parts and auxiliary engine equipment used at a high temperature and a high rotational speed has ever been increasing, improvement in resistance to seizure has been especially demanded.

SUMMARY OF THE INVENTION

Accordingly, an object of the invention is to provide a grease composition which exhibits an excellent effect against flaking to an extent not heretofore attained.

Another object of the invention is to provide a rolling bearing having an extended nonseizure life to an extent not heretofore attained.

The inventors of the present invention have extensively studied the mechanism of a flaking phenomenon. They considered as a result that flaking occurs by the synergistic action of an increase of load due to resonance of a bearing and the flexural stress produced by deformation of the outer race and that the effect of greasing in extending the non-flaking life of a bearing is based on the damping properties of a grease film sufficiently spreading between rolling elements and the raceways, by which the amplitude of resonant vibrations and the maximum load of the rolling elements can be reduced (see *NSK Technical Journal*, No. 656, p. 1 (1993)). The inventors paid their attention to the fact that the effect against flaking can be enhanced by increasing the damping properties of the grease film.

The inventors reached the conclusion that reinforcement of the gel structure formed of a thickener would bring about enhanced film-forming properties of grease and an increased damping effect on the impact load and that such reinforcement of the gel structure can be achieved most effectively by incorporating an inorganic filler into a grease composition.

Based on this finding, the invention provides a grease composition comprising a base oil, a thickener selected from a metallic soap and a urea compound, and an inorganic filler having an average particle size of not greater than 2 μm (hereinafter referred to as a first embodiment).

On the other hand, grease sealed up in a rolling bearing rebounds from the seal or shield. Therefore, it is only a slight amount of grease on the raceway or in the vicinities of the cage that contributes to lubrication of the bearing and virtually decides the nonseizure life of the bearing. If such a small amount of grease on the raceway or the cage or in the vicinities thereof reduces its fluidity due to deterioration by oxidation or hardening, lubrication becomes insufficient, making the bearing susceptible to wear, eventually resulting in seizure.

The inventors have conducted extensive investigation into a seizure phenomenon of rolling bearings and found as a result that fine particles of an inorganic filler dispersed in grease is effective to inhibit seizure of rolling bearings.

Based on the above finding, the invention provides a rolling bearing having sealed therein a grease composition comprising a base oil, a urea thickener, and an inorganic filler having an average particle size of not greater than 2 $\mu$m (hereinafter referred to as a second embodiment).

The grease composition sealed up in the rolling bearing according to the second embodiment has dispersed therein fine particles. It is considered that the grease present on the contact area between rolling elements and the raceways can retain the form of film owing to the fine particles even under a great shear stress by high-speed rotation. Thus, direct contact between metallic members can be prevented thereby to extend the nonseizure life.

In the second embodiment, use of a urea compound as a thickener brings about improvement in heat resistance and, as a result, the effect against seizure is further enhanced.

BRIEF DESCRIPTION OF THE DRAWING

Figure is a partial cross section of a deep groove ball bearing sealed with a contact rubber seal.

DETAILED DESCRIPTION OF THE INVENTION

Figure 1:
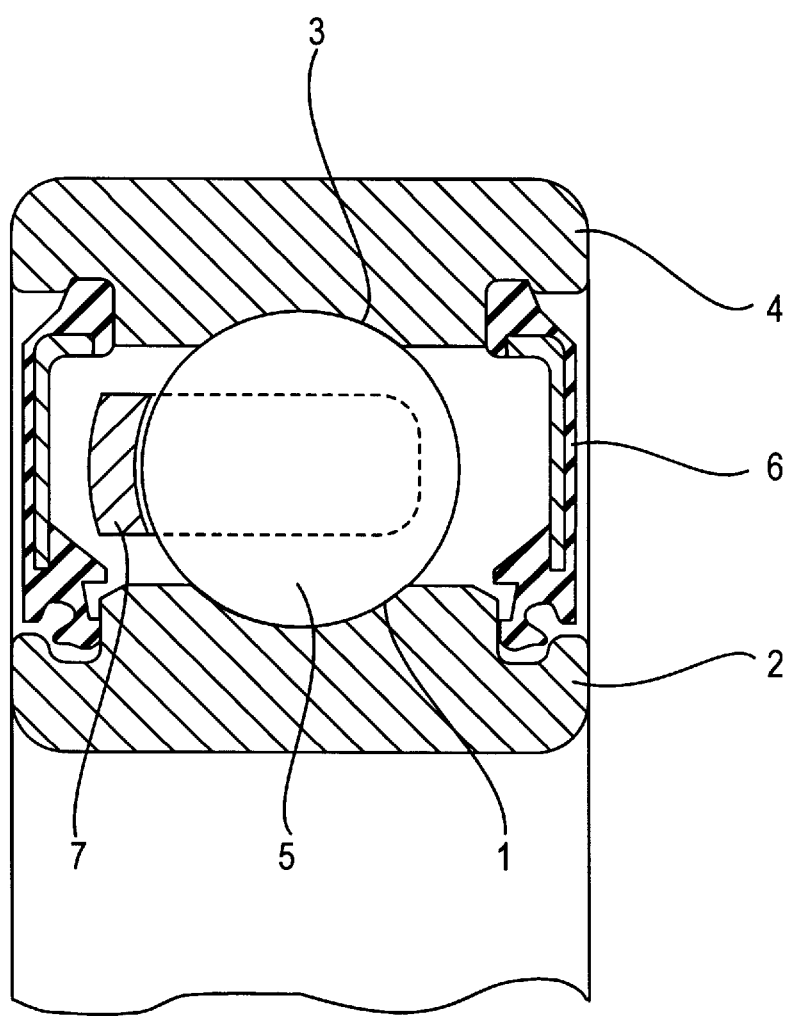

The inorganic filler which can be used in the present invention is not particularly limited as long as it is capable of reinforcing the gel structure formed of a thickener. Inorganic fillers having themselves a thickening effect are more effective in reinforcing the gel structure.

Examples of usable inorganic fillers include metal oxides (e.g., $SiO_2$, $Al_2O_3$, MgO, $TiO_2$, PZT, and ZnO), metal nitrides (e.g., $Si_3N_4$, ZrN, CrN, and TiAlN), metal carbides (e.g., SiC, TiC, and WC), clay minerals (e.g., bentonite, smectite and mica), and diamond. Solid lubricants, such as $MoS_2$, graphite, BN, and $WS_2$ are also useful.

These inorganic fillers can be subjected to surface treatment for rendering their surface lipophilic so as to have improved affinity to a base oil or a urea thickener.

Of the above-cited inorganic compounds, metal oxides or clay minerals that possess a thickening effect themselves are preferred.

The inorganic filler for use in the invention should have a particle size that does not cause troubles in rolling bearings. In general, particles having an average particle size exceeding about 2 $\mu$m act as foreign matter (dust). Hard particles whose average particle size is greater than 2 $\mu$m accelerate wear of the raceways and the rolling elements, causing damage to the bearing in the early stage and sometimes deteriorating the acoustic properties. Accordingly, the average particle size of the inorganic filler is preferably not greater than 2 $\mu$m.

Taking the lubrication life into consideration, the average particle size of the inorganic filler is preferably smaller than the thickness of a film of the base oil. Since the thickness of a film of the base oil is generally about 0.2 $\mu$m, a still preferred average particle size is not greater than 0.2 $\mu$m.

As far as the average particle size is not greater than 2 $\mu$m, the particles are not particularly limited in shape and can be spheres, polyhedrons (e.g., cubes or rectangular parallelepipeds) or even needles. Spherical or nearly spherical particles are preferred.

It has been confirmed that a satisfactory effect is well produced in preventing seizure as expected in the second embodiment when the average particle size is 1 $\mu$m or smaller.

The grease composition preferably has a worked penetration controlled to No. 3 to No. 1 according to NLGI (JIS K 2220) for use in a sealed rolling bearing. For the penetration control, a thickener is usually used in an amount of 10 to 35% by weight based on the total composition.

In the grease composition according to the first embodiment, the inorganic filler is preferably used in an amount of 0.05 to 15% by weight. If the content of the inorganic filler is less than 0.05%, the reinforcing effect is insufficient. If it exceeds 15%, the particles tend to deteriorate the acoustic properties or tend to accelerate wear of the bearing. To ensure the reinforcing effect without adversely affecting the lubrication life, a still preferred content of the inorganic filler is 0.1 to 10% by weight.

The grease composition for use in the second embodiment preferably contains the inorganic filler in an amount of 0.5 to 10% by weight based on the total composition. If the content of the inorganic filler is less than 0.5%, the reinforcing effect is insufficient. If it exceeds 10%, the large amount of the particles tend to deteriorate the acoustic properties or tend to accelerate wear of the bearing, thereby adversely affecting the lubrication life of the bearing. To ensure the extension of non-seizure life without adversely affecting the acoustic properties and the lubrication life, a still preferred content of the inorganic filler is 1 to 8% by weight.

The thickener which can be used in the grease composition of the first embodiment is not particularly limited provided that the thickener is capable of forming a gel structure in which a base oil can be retained. For example, the thickener is selected appropriately from metallic soaps containing Li, Na, etc., composite metallic soaps containing Li, Na, Ba, Ca, etc., and urea compounds, such as diurea compounds and polyurea compounds. While metallic soaps exhibit satisfactory acoustic properties, composite metallic soaps are preferable to metallic soaps from the standpoint of leakproofness. Urea compounds are preferred where heat resistance is demanded.

The urea thickener which can be used in the second embodiment includes diurea compounds and polyurea compounds. These urea compounds have heat resistance per se, thereby making a contribution to improvement in heat resistance of the grease composition.

The urea compound which can be used according to the first and second embodiments is preferably a polyurea (such as diurea, triurea, and tetraurea) and more preferably a diurea.

Especially, the diurea having the following structure is preferred.

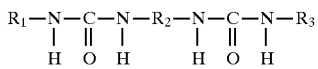

$R_1$ and $R_3$ each independently represents an aromatic ring-containing hydrocarbon group having 7 to 12 carbon atoms (e.g., toluyl, xylyl, phenethyl, t-butylphenyl, dodecylphenyl, benzyl, and methylbenzyl), a cyclohexyl group, an alkylcyclohexyl group having 7 to 12 carbon atoms (e.g., methylcyclohexyl, dimethylcyclohexyl, ethylcyclohexyl, diethylcyclohexyl, propylcyclohexyl, isopropylcyclohexyl, 1-methyl-3-propylcyclohexyl, butylcyclohexyl, pentylcyclohexyl, pentylmethylcyclohexyl, and hexylcyclohexyl), or an alkyl group having 8 to 20 carbon atoms (e.g., octyl, nonyl, decyl, undecyl, dodecyl, tridecyl, tetradecyl, pentadecyl, hexadecyl, heptadecyl, octadecyl, nonyldecyl, and eicosyl).

$R_2$ is a divalent hydrocarbon group containing an aromatic ring, and preferably represents:

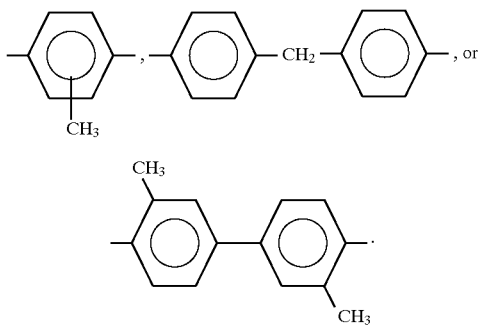

A thickener in a grease composition is uniformly dispersed and forms a gel structure composed of chains of the molecules or crystals. The inorganic filler seems to enter the interstices among the molecules or crystals of the thickener to reinforce the gel structure. Therefore, when a thickener effective in preventing flaking (e.g., the diurea compound mainly terminated with an aromatic hydrocarbon group as disclosed in JP-A-5-98280, JP-A-5-194979, and JP-A-5-263091 supra) is added to a grease composition, it contributes to further improvement in the effect of preventing flaking. When a thickener which has no effect of preventing flaking but has excellent lubricating action (e.g., the diurea compound mainly terminated with a cyclohexyl group as disclosed in JP-A-3-79698, JP-A-5-140576, and JP-A-6-17079 supra) is incorporated into a grease composition, the composition is endowed with an effect of flaking prevention in addition to the lubricating effect.

The base oil which can be used in the present invention is not particularly limited, and any base oil commonly used in lubricating oils is usable. In order to avoid an increase in initial torque due to insufficient low-temperature fluidity or to prevent seizure which would occur in a high temperature due to insufficient oil film formation, the base oil preferably has a kinetic viscosity of 10 to 400 mm$^2$/sec, particularly 20 to 250 mm$^2$/sec, especially 40 to 150 mm$^2$/sec, at 40° C. The kinetic viscosity of a base oil is usually measured with a glass capillary tube viscometer.

It is preferable for obtaining an extended lubrication life to use 10% by weight or more of an ester oil (especially a polyol ester oil) based on the weight of the base oil.

Useful base oils include lubricant oils of mineral oils, synthetic oils, and natural oils. The mineral lubricant oils include mineral oils purified by an appropriate combination of vacuum distillation, solvent deasphating, solvent extraction, hydrogenolysis, solvent dewaxing, sulfuric acid treatment, clay treatment, hydrorefining, and the like. The synthetic lubricant oils include hydrocarbon oils, aromatic oils, ester oils, and ether oils. The hydrocarbon oils include poly-α-olefins, such as n-paraffin, isoparaffin, polybutene, polyisobutylene, a 1-decene oligomer, and a 1-decene/ethylene co-oligomer, and hydrogenation products thereof. The aromatic oils include alkylbenzenes, e.g., monoalkylblenzenes, dialkylbenzenes and polyalkylbenzenes; and alkylnaphthalenes, e.g., monoalkylnaphthalenes, dialkylnaphthalenes and polyalkylnaphthalenes. The ester oils include aromatic esters, such as diesters (e.g., dibutyl sebacate, di-2-ethylhexyl sebacate, dioctyl adipate, diisodecyl adipate, ditridecyl adipate, ditridecyl glutarate, and methylacetyl licinolate), trioctyl trimellitate, tridecyl trimellitate, and tetraoctyl pyromellitate; polyol esters, such as trimethylolpropane caprylate, trimethylolpropane pelargonate, pentaerythritol 2-ethylhexanoate, and pentaerythritol pelargonate; and complex esters that are oligoesters between a polyhydric alcohol and a dibasic/monobasic mixed fatty acid. The ether oils include polyglycols, such as polyethylene glycol, polypropylene glycol, polyethylene glycol monoethers, and polypropylene glycol monoethers; and phenyl ethers, such as monoalkyl triphenyl ethers, alkyl diphenyl ethers, dialkyl diphenyl ethers, pentaphenyl ether, tetraphenyl ether, monoalkyl tetraphenyl ethers, and dialkyl tetraphenyl ether. Additionally, tricresyl phosphate, silicone oils, and perfluoroalkyl ether oils are also useful synthetic oils.

These base oils can be used either individually or as a mixture thereof. The kinetic viscosity of the base oils to be used is adjusted to the above-described preferred range.

If desired, the grease composition according to the present invention can further contain one or more additives in a total amount of up to 20% by weight based on the total composition in addition to the base oil, the thickener, and the inorganic filler. Useful additives include antioxidants, such as amines, phenols, sulfur compounds, and zinc dithiophosphate; rust preventives, such as petroleum sulfonates, dinonyl naphthalenesulfonate, and sorbitan esters; oiliness improvers, such as fatty acids and vegetable oils; metal deactivators, such as benzotriazole and sodium sulfite; extreme pressure agents, such as chlorine-, sulfur- or phosphorus-containing organic compounds, zinc dithiophosphate, and organomolybdenum compounds; and viscosity index improvers, such as polymethacrylate, polyisobutylene, and polystyrene.

The grease composition of the invention is prepared by reacting the thickener in the base oil. The inorganic filler is preferably added at the time of the reaction. The inorganic filler may be mixed with a grease composition prepared from the base oil and the thickener, provided that the mixture after addition of the inorganic filler should be stirred thoroughly to uniformly disperse the particles. Heat application during the stirring is effective.

For the sake of process convenience, the additives other than the inorganic filler are preferably added simultaneously with the inorganic filler.

The thus prepared grease composition is sealed up in a sealed type deep groove ball bearing with a contact rubber seal, for example the one shown in Figure. The amount of the grease composition to be sealed is selected from the range generally employed in this type of rolling bearings.

The present invention will now be illustrated in greater detail with reference to Examples and Comparative Examples, but it should be understood that the present invention is not deemed to be limited thereto.

EXAMPLES 1 TO 9 AND COMPARATIVE EXAMPLES 1 TO 8

Grease compositions were prepared from a base oil, a thickener, and an inorganic filler according to the formulations shown in Tables 4 and 5 below. The thickener, the inorganic filler, and the oil base were used in a total amount of 970 g, and an amine antioxidant and a sulfonate rust preventive were added in a total amount of 30 g to give a grease composition weighing 1000 g.

The urea compound used as a thickener was obtained by reacting 4,4'-diphenylmethane diisocyanate (hereinafter abbreviated as MDI) with 2 mol, per mole of MDI, of an amine(s) having the formulation shown in Table 1 below. There is a tendency that the effect of the resulting urea compounds in preventing flaking is increasing in reverse order of formulation number. The formulations of the base oils and inorganic fillers used in the grease compositions are shown in Tables 2 and 3 below, respectively.

TABLE 1

| Amine Formulation (mol/mol-MDI) for Urea Thickener | | | | |
|---|---|---|---|---|
| | Formulation No. | | | |
| Amine | 1 | 2 | 3 | 4 |
| p-Toluidine | 0.5 | — | — | — |
| Cyclohexylamine | 1.5 | 2.0 | 1.0 | — |
| Stearylamine | — | — | 1.0 | 1.0 |
| Octylamine | — | — | — | 1.0 |

TABLE 2

| Formulation of Base Oil (part by weight) | | | |
|---|---|---|---|
| | Formulation No. | | |
| | 1 | 2 | 3 |
| Dialkyl diphenyl ether | 70 | — | 50 |
| Poly-α-olefin | 30 | 100 | — |
| Polyol ester | — | — | 50 |
| Kinetic Viscosity (mm²/sec, 40° C.) | 80 | 48 | 55 |

TABLE 3

| Inorganic Filler | | | | |
|---|---|---|---|---|
| Species No. | Composition | Average Particle Size (nm) | Trade Name | Maker |
| 1 | $Al_2O_3$ | 13 | Aluminum Oxide C | Nippon Aerosil K.K. |
| 2 | MgO | 10 | High-purity Ultrafine Magnesia 100A | Ube Chemical Industries Co., Ltd. |

TABLE 3-continued

| Inorganic Filler | | | | |
|---|---|---|---|---|
| Species No. | Composition | Average Particle Size (nm) | Trade Name | Maker |
| 3 | MgO | 200 | High-purity Ultrafine Magnesia 2000A | Ube Chemical Industries Co., Ltd. |
| 4 | $TiO_2$ | 21 | Titanium Dioxide P25 | Nippon Aerosil K.K. |
| 5 | smectite | ca. 50 | Lucentite SAN | Co-op Chemical Co., Ltd. |

The resulting grease compositions were tested in accordance with the following methods. The results obtained are shown in Tables 4 and 5.

1) Acoustic Test

In a sealed type deep groove ball bearing with contact rubber seals (inner diameter: 17 mm; outer diameter: 47 mm; width: 14 mm) was sealed up 2.4 g of each of the grease compositions. The noise of the ball bearing after 30-second rotation at 1800 rpm was measured in terms of Anderon value. Bearings having an Anderon value of 6 or less were graded "pass". Anderon values of 6 or less are deemed equal or superior to the acoustic level of commercially available urea-based grease products. Each sample was tested twice.

2) Bearing Flaking Test

Flaking resistance of a bearing was evaluated by repetition of abrupt increases and decreases of rotational speed of the bearing. That is, 1.0 g of the grease composition was sealed up into a sealed type deep groove ball bearing with contact rubber seals (inner diameter: 12 mm; outer diameter: 37 mm; width: 12 mm; equipped with a plastic cage), and the ball bearing was continuously rotated at an outer race rotational speed repeatedly varied between 1000 rpm and 6000 rpm at room temperature under a radial load of 120 kgf. The time required until the surface of the inner race suffered flaking, and the vibration increased to stop the rotation (i.e., a nonflaking life) was measured. The testing was repeated 4 times for each sample.

The testing was ended at 500 hours, regarding a nonflaking life of 500 hrs or longer to be satisfactory.

3) High-temperature, High-speed Seizure Test (Lubrication Life Test)

Into a sealed deep groove ball bearing with contact rubber seals (inner diameter: 17 mm; outer diameter: 47 mm; width: 14 mm) equipped with a plastic cage was sealed up 2.3 g of each of the grease compositions of Examples 1 to 4 and Comparative Examples 1 to 4. The ball bearing was continuously rotated at an inner race rotational speed of 22000 rpm, at an outer race temperature of 150° C., under a radial load of 10 kgf and an axial load of 20 kgf. The time required until the outer race temperature reached 165° C., which was regarded as being seizure. A nonseizure life of 1000 hours was taken as a standard of durability. The testing was ended at 1000 hours, regarding a nonseizure life of 1000 hrs or longer to be satisfactory. The testing was repeated 3 times for each sample.

TABLE 4

|  | Example 1 | Example 2 | Example 3 | Example 4 | Example 5 | Example 6 | Example 7 | Example 8 | Example 9 |
|---|---|---|---|---|---|---|---|---|---|
| Composition: | | | | | | | | | |
| Thickener | Formulation 4 15 wt % | Formulation 3 15 wt % | Formulation 1 9 wt % | Formulation 2 22 wt % | Formulation 3 15 wt % | Formulation 1 10 wt % | lithium stearate 20 wt % | Formulation 2 22 wt % | Formulation 4 15 wt % |
| Inorganic Filler | Species 1 3 wt % | Species 2 3 wt % | Species 1 6 wt % | Species 2 0.05 wt % | Species 3 3 wt % | Species 2 12 wt % | Species 1 3 wt % | Species 4 3 wt % | Species 5 3 wt % |
| Base oil | Formulation 1 | Formulation 1 | Formulation 3 | Formulation 3 | Formulation 2 | Formulation 3 | Formulation 2 | Formulation 1 | Formulation 2 |
| Worked Penetration (NLGI) | No. 2 | No. 2 | No. 1 | No. 2 | No. 2 | No. 3 | No. 3 | No. 2 | No. 2 |
| Initial Acoustic Properties (Anderon) | 2.5 3.5 | 2.0 2.5 | 3.5 4.5 | 2.0 2.0 | 3.0 4.5 | 5.5 6.0 | 2.0 2.5 | 2.5 3.0 | 3.5 6.0 |
| Nonflaking Life (hr) | ≧500 " " | ≧500 " " | ≧500 " " | ≧500 " " | ≧500 " " | ≧500 " " | ≧500 " " | ≧500 " " | ≧500 " " |
| Nonseizure Life (hr) | ≧1000 " 980 | ≧1000 " " | ≧1000 " " | ≧1000 " " | | | | | |

TABLE 5

|  | Compara. Example 1 | Compara. Example 2 | Compara. Example 3 | Compara. Example 4 | Compara. Example 5 | Compara. Example 6 | Compara. Example 7 | Compara. Example 8 |
|---|---|---|---|---|---|---|---|---|
| Composition: | | | | | | | | |
| Thickener | Formulation 1 9 wt % | Formulation 2 22 wt % | Formulation 3 15 wt % | Formulation 4 15 wt % | lithium stearate 18 wt % | | Formulation 2 22 wt % | Formulation 3 15 wt % |
| Inorganic Filler | | | | | | Species 3 20 wt % | Species 2 0.01 wt % | Fe$_3$O$_4$ 3 wt % |
| Base oil | Formulation 1 | Formulation 3 | Formulation 2 | Formulation 1 | Formulation 2 | Formulation 2 | Formulation 2 | Formulation 1 |
| Worked Penetration (NLGI) | No. 1 | No. 2 | No. 2 | No. 2 | No. 2 | No. 1 | No. 2 | No. 2 |
| Initial Acoustic Properties (Anderon) | 2.5 3.5 | 2.5 2.5 | 2.5 2.5 | 2.0 2.5 | 1.5 2.0 | 20 38 | 2.0 2.5 | 6.0 7.5 |
| Nonflaking Life (hr) | ≧500 460 380 310 | 480 420 340 290 | 270 250 220 200 | 310 220 180 150 | 210 180 150 95 | — — — — | 450 450 380 320 | ≦100* ≦100 — — |
| Nonseizure Life (hr) | ≧1000 880 810 | ≧1000 " " | 380 420 590 | ≧1000 960 790 | — — — | — — — | — — — | — — — |

Note:
*The testing was stopped because vibration increased due to wear of the raceway.

The following conclusions are drawn from the results in Tables 4 and 5. The grease compositions of Comparative Examples show an increase in effect against flaking according as the formulation No. of the thickener falls. On incorporating the inorganic filler into these grease compositions, the nonflaking life of the bearings is extended without adversely affecting the initial acoustic properties in every case. As regards the lubrication life, the grease compositions of Examples 1 to 4 are equal or superior to the corresponding compositions containing no inorganic filler (Comparative Examples 1 to 4).

It is seen from the results of Comparative Example 6 that the inorganic filler, when added in an amount exceeding the range specified in the invention, causes considerable deterioration of acoustic properties. It is also seen from the results of Comparative Example 7 that the inorganic filler added in a lesser amount than specified produces no effect in extending the nonflaking life.

In Comparative Example 8 wherein magnetite (Fe$_3$O$_4$) particles whose average particle size is 5 μm, that is, out of the range specified in the invention was used as an inorganic filler, no satisfactory results were obtained in terms of initial acoustic properties nor nonflaking life.

It has thus proved that the present invention provides a grease composition containing a thickener which produces an effect against flaking with an improved effect in preventing flaking and provides a grease composition containing a thickener which is not effective against flaking but exhibits excellent lubricating properties with an effect in preventing flaking as well as the lubricating properties.

The grease composition of the first embodiment of the invention exhibits not only the performance essentially possessed but an effect against flaking and is suited for application to rolling bearings used in electric parts and auxiliary engine equipment of automobiles, such as an alternator, an electromagnetic clutch for an air conditioner, an intermediate pulley, an electric fan motor, and a water pump.

EXAMPLES 10 TO 20 AND COMPARATIVE EXAMPLES 9 TO 14

Grease compositions were prepared as follows according to the formulations shown in Tables 7 to 9 below.

A base oil mixed with a diisocyanate compound (MDI) and a base oil mixed with an amine compound (1.6 mol of p-toluidine and 0.4 mol of octylamine, each per mole of MDI) were reacted by heating while stirring to obtain a semisolid substance. An amine antioxidant previously dissolved in a base oil was added thereto and stirred. After allowing the mixture to cool slowly, a rust preventive and inorganic filler particles were added, and the resulting mixture was passed through a roll mill to prepare a grease composition. Each grease composition contained the urea compound, the lithium soap, and the inorganic filer each in an amount shown in Tables 7 to 9, 2% by weight of the antioxidant, 3% by weight of the rust preventive, and the remainder amount of the base oil. The base oils having formulations shown in Table 6 were used according to the indications in Tables 7 to 9.

TABLE 6

Formulation of Base Oil (part by weight)

| | Formulation No. | | | | | |
|---|---|---|---|---|---|---|
| | 1 | 2 | 4 | 5 | 6 | 7 |
| Dialkyl diphenyl ether | 70 | — | 70 | 100 | — | — |
| Poly-α-olefin | 30 | 100 | — | — | 100 | — |
| Polyol ester | — | — | 30 | — | — | 100 |
| Kinetic Viscosity (mm$^2$/sec, 40° C.) | 80 | 48 | 71 | 100 | 400 | 33 |

Into a sealed type deep groove ball bearing with contact rubber seals equipped with a plastic cage (inner diameter: 17 mm; outer diameter: 52 mm; width: 16 mm) was sealed up 2.4 g of each of the resulting grease compositions. The ball bearings containing the grease composition were tested according to the following methods. The results obtained are shown in Tables 7 to 9.

1) High-temperature, High-speed Seizure Test

The ball bearing was continuously rotated at an inner race rotational speed of 22000 rpm, at an outer race temperature of 140° C., and under a radial load of 98 N. The time required until the outer race temperature reached 155° C. or until the torque of the bearing increased to cause an overcurrent of the motor was measured, which time was regarded as a nonseizure life. Ball bearings having a nonseizure life of 700 hours or longer were given a pass. The testing was ended at 1000 hours, regarding a nonseizure life of 1000 hrs or longer as being satisfactory. The testing was conducted twice for each sample.

2) Acoustic Test

The noise of the ball bearing was measured in terms of Anderon value after 30-second rotation at 1800 rpm. Bearings having an Anderon value of 6 or less were given a "pass". Anderon values of 6 or less are regarded as being equal or superior to the acoustic level of commercially available urea-based grease products.

TABLE 7

| | Example 10 | Example 11 | Example 12 | Example 13 | Example 14 | Example 15 |
|---|---|---|---|---|---|---|
| Thickener: | urea | urea | urea | urea | urea | urea |
| Content (wt %) | 25 | 25 | 19 | 18 | 25 | 22 |
| Base oil: | ether | ether | ether | ether | ether | ether |
| Formulation No. | 5 | 5 | 5 | 5 | 5 | 5 |
| Kinetic Viscosity (mm$^2$/sec, 40° C.) | 100 | 100 | 100 | 100 | 100 | 100 |
| Worked Penetration | 288 | 285 | 268 | 246 | 285 | 286 |
| Inorganic Filler: | | | | | | |
| Kind | magnesium oxide | magnesium oxide | magnesium oxide | magnesium oxide | aluminum oxide | magnesium oxide |
| Amount (wt %) | 0.5 | 1.0 | 8.0 | 10.0 | 3.0 | 5.0 |
| Average particle size (μm) | 0.01 | 0.01 | 0.01 | 0.01 | 0.013 | 0.1 |
| Nonseizure Life (hr) | 750 880 | ≧1000 ≧1000 | ≧1000 ≧1000 | 950 ≧1000 | ≧1000 ≧1000 | ≧1000 ≧1000 |
| Acoustic Properties (Anderon) | 2 to 3 | 2 to 3 | 2 to 3 | 4 to 5 | 2 to 3 | 3 to 4 |

TABLE 8

|  | Example 16 | Example 17 | Example 18 | Example 19 | Example 20 |
|---|---|---|---|---|---|
| Thickener: | urea | urea | urea | urea | urea |
| Content (wt %) | 25 | 25 | 25 | 25 | 25 |
| Base oil: | ether poly-α-olefin | ether ester | poly-α-olefin | poly-α-olefin | ether |
| Formulation No. | 1 | 4 | 2 | 6 | 5 |
| Kinetic Viscosity (mm$^2$/sec, 40° C.) | 80 | 71 | 48 | 400 | 100 |
| Worked Penetration | 287 | 283 | 278 | 283 | 269 |
| Inorganic Filler: |  |  |  |  |  |
| Kind | magnesium oxide | magnesium oxide | magnesium oxide | magnesium oxide | titanium oxide |
| Amount (wt %) | 3.0 | 3.0 | 3.0 | 3.0 | 3.0 |
| Average particle size (μm) | 0.01 | 0.01 | 0.01 | 0.01 | 0.02 |
| Nonseizure Life (hr) | ≧1000 ≧1000 | ≧1000 ≧1000 | ≧1000 ≧1000 | ≧1000 ≧1000 | ≧1000 ≧1000 |
| Acoustic Properties (Anderon) | 2 to 3 | 2 to 3 | 2 to 3 | 2 to 3 | 2 to 3 |

TABLE 9

|  | Compara. Example 9 | Compara. Example 10 | Compara. Example 11 | Compara. Example 12 | Compara. Example 13 | Compara. Example 14 |
|---|---|---|---|---|---|---|
| Thickener: | urea | urea | urea | urea | lithium soap | lithium soap |
| Content (wt %) | 25 | 25 | 17 | 25 | 20 | 20 |
| Base oil: | ether | ether poly-α-olefin | ether | ether ester | ester | ester |
| Formulation No. | 5 | 1 | 5 | 4 | 7 | 7 |
| Kinetic Viscosity (mm$^2$/sec, 40° C.) | 100 | 80 | 100 | 71 | 33 | 33 |
| Worked Penetration | 290 | 265 | 233 | 259 | 242 | 220 |
| Inorganic Filler: | none | none |  | none |  |  |
| Kind |  |  | magnesium oxide |  |  | magnesium oxide |
| Amount (wt %) |  |  | 12.0 |  |  | 3.0 |
| Average particle size (μm) |  |  | 0.01 |  |  | 0.01 |
| Nonseizure Life (hr) | 288 356 | 322 408 | 308 435 | 511 667 | 215 307 | 195 343 |
| Acoustic Properties (Anderon) | 2 to 3 | 2 to 3 | 7 to 9 | 2 to 3 | 2 to 3 | 2 to 3 |

As can be seen from the results in Tables 7 to 9, the rolling bearings according to the invention which contain a grease composition comprising a urea compound and an inorganic filler are excellent in nonseizure life and acoustic properties.

Comparing Example 13 with Comparative Example 11, it is seen that too much inorganic filler results in reduction of acoustic properties. It was confirmed that the upper limit of the content of the inorganic filler is about 10% by weight in order to meet the standard of acoustic level for practical use, i.e., an Anderon value of 6 or less. Further, the results of Comparative Examples 13 to 14, in which a commercially available grease composition containing lithium soap as a thickener is used, provide confirmation that incorporation of the inorganic filler produces no effect in extending the nonseizure life in cases where the thickener is not the urea compound specified in the invention.

It has thus proved that the rolling bearing according to the present invention has a greatly extended nonseizure life owing to the enhanced gel structure of the lubricating grease film and is suited for use at a high temperature and high rotational speed as in electric parts and auxiliary engine equipment of automobiles, such as an alternator, an electromagnetic clutch for an air conditioner, an intermediate pulley, an electric fan motor, and a water pump.

While the invention has been described in detail and with reference to specific examples thereof, it will be apparent to one skilled in the art that various changes and modifications can be made therein without departing from the spirit and scope thereof.

What is claimed is:

1. A rolling bearing having sealed therein a grease composition comprising a base oil, a thickener selected from the group consisting of a metallic soap and a urea compound, and an inorganic filler having an average particle size of not greater than 2 μm.

2. The rolling bearing of claim 1, wherein said inorganic filler is selected from the group consisting of metal oxides, metal nitrides, metal carbides, clay minerals and diamond.

3. The rolling bearing of claim 1, wherein said inorganic filler is selected from the group consisting of MgO, $Al_2O_3$ and $TiO_2$.

4. The rolling bearing of claim 1, wherein said inorganic filler is present in an amount of 0.5 to 10% by weight based on said grease composition, and wherein the thickener is present in an amount of 10 to 35% by weight based on the grease composition.

5. A rolling bearing having sealed therein a grease composition comprising a base oil, a urea thickener, and an inorganic filler having an average particle size of not greater than 2 $\mu$m.

6. The rolling bearing of claim 5, wherein said inorganic filler is selected from the group consisting of metal oxides, metal nitrides, metal carbides, clay minerals and diamond.

7. The rolling bearing of claim 5, wherein said inorganic filler is selected from the group consisting of MgO, $Al_2O_3$ and $TiO_2$.

8. The rolling bearing of claim 7, wherein said inorganic filler is present in an amount of 0.5 to 10% by weight based on said grease composition, and wherein the thickener is present in an amount of 10 to 35% by weight based on the grease composition.

9. The rolling bearing of claim 8, wherein said inorganic filler has an average particle size of not greater than 1 $\mu$m.

* * * * *